United States Patent [19]

Meyer

[11] Patent Number: 4,936,721

[45] Date of Patent: Jun. 26, 1990

[54] DRILL REAMER BIT

[76] Inventor: Jerry H. Meyer, 1101 LeBlanc, Lincoln Park, Mich. 48146

[21] Appl. No.: 374,930

[22] Filed: Jul. 3, 1989

[51] Int. Cl.$^5$ ............................................. B23B 51/08
[52] U.S. Cl. ...................................... 408/224; 408/230
[58] Field of Search .............. 408/224, 202, 223, 225, 408/230, 59, 80, 227; 407/54; 29/566

[56] References Cited

U.S. PATENT DOCUMENTS

| | | | |
|---|---|---|---|
| 252,074 | 1/1882 | Southwick | 408/223 X |
| 396,663 | 1/1889 | Morisseau | 408/202 |
| 1,387,994 | 8/1921 | Lewis | 408/224 |
| 2,389,909 | 11/1945 | Hofbauer | 408/224 |
| 2,897,695 | 8/1959 | Winslow | 408/224 |
| 3,779,664 | 12/1973 | Caley et al. | 408/225 |
| 4,507,028 | 3/1985 | Matsushita | 408/230 |
| 4,605,347 | 8/1986 | Jodock et al. | 408/224 |

FOREIGN PATENT DOCUMENTS 0187421 10/1984 Japan .................................. 408/230

Primary Examiner—Z. R. Bilinsky
Attorney, Agent, or Firm—Basile and Hanlon

[57] ABSTRACT

A drill/reamer bit has a drill portion formed by cutting edges at the end of a plurality of flutes. A reamer portion is contiguous with the drill portion and includes a first relief formed on each flute surface disposed at a predetermined angle with respect to the flute surface to form a first reamer cutting edge. A second relief is formed contiguous with the first face on each reamer portion and is disposed at a second angle, less than the first angle with respect to the flute surface. Preferably, the angle of the first reamer relief is substantially 30° and the angle of the second reamer relief is substantially 10°.

9 Claims, 1 Drawing Sheet

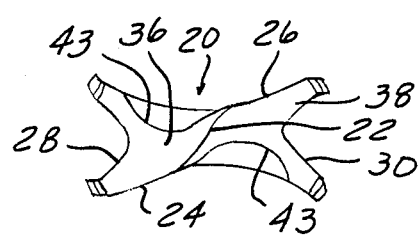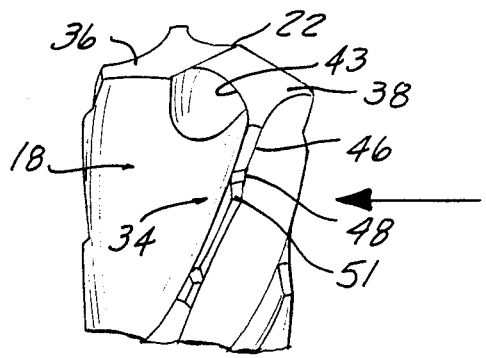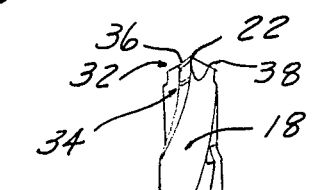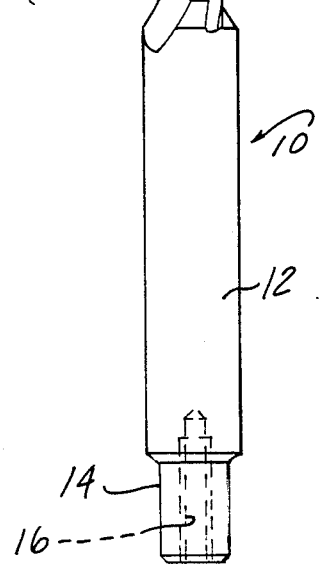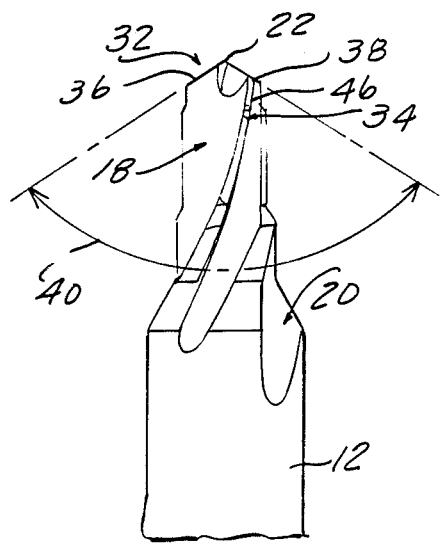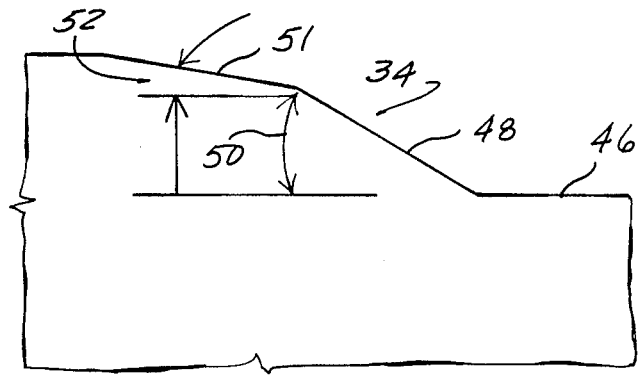
FIG-2
FIG-3
FIG-1
FIG-4
FIG-5

DRILL REAMER BIT

BACKGROUND OF THE INVENTION

Field of the Invention

The present invention relates, in general, to rotary cutting tools or bits and, specifically, to combined drill/reamer bits.

In machining operations for forming bores in metallic workpieces, rotary cutting tools, such as drills bits, are commonly employed. Such drill bits are mounted in a spindle which rotates the bit at high speed and advances the bit at a predetermined feed rate into the workpiece.

Depending upon the material of the workpiece, the feed rate of the drill bit which comprises its rate of advance into the workpiece and its speed of rotation are selected to provide a finished bore having required tolerances in location, diameter, concentricity and surface finish. However, in certain instances, bore diameter tolerances cannot be held unless several passes are made with the drill or a ream finish operation is employed. Such steps add to manufacturing costs due to the increased time required to manufacture a workpiece and the added cost of additional bits and spindles for successive drilling and reaming operations on a single workpiece.

Attempts have been made to address these problems by devising combined drill/reamer bits which perform both drilling and reaming operations in a single pass.

Although such previous drill/reamer bits solve or minimize many of the problems noted above, it would still be desirable to provide a combined drill/reamer bit which performs a machining operation in a single pass with a high degree of tolerance. It would also be desirable to provide drill/reamer bit which can be easily modified for different applications.

SUMMARY OF THE INVENTION

The present invention is a drill/reamer bit which performs both drilling and reaming operations in a single pass.

The drill/reamer bit comprises a cylindrical body having a plurality of flutes separated by web portions which terminate in a cutting tip. The flutes may vary in number and may be either straight or spiral depending upon the particular application. A drill portion and a reamer portion are formed on the body. The edge of the flutes adjacent the cutting tip define a cutting edge for the drill portion of the drill/reamer bit. The reamer portion is spaced from the tip and is contiguous with the drill portion. The reamer portion includes a first relief intersecting the flute surface of the drill portion and extending angularly outward from the flute surface at a predetermined first angle. A second relief is formed on the reamer portion contiguous with and extending angularly outward at a second predetermined angle from the first relief. The second predetermined angle is less than the first predetermined angle of the first relief with respect to the longitudinal axis of the cylindrical body of the drill/reamer bit.

In a preferred embodiment, the angle of the first relief with respect to the longitudinal axis of the drill/reamer bit is between 30° and 45°, with 30° being preferred. The angle of the second relief is between 5° and 15°, with a 10° angle with respect to the flute surface being preferred.

The drill/reamer bit of the present invention enables both drilling and reaming operations to be performed in a single operation. The resultant bore in a workpiece formed by the drill/reamer bit of the present invention has a high degree of surface finish tolerance thereby minimizing manufacturing costs since such tolerances in a single operation rather than several successive operations as has been commonly required. Further, the drill/reamer bit of the present invention may be easily modified for different applications on different materials and at different drill speed and feed rates.

BRIEF DESCRIPTION OF THE DRAWING

The various features, advantages and other uses of the present invention will become more apparent by referring to the following detailed description and drawing in which:

FIG. 1 is a side elevational view of the drill/reamer bit of the present invention;

FIG. 2 is an enlarged plan view of the drill/reamer bit shown in FIG. 1;

FIG. 3 is an enlarged, partial, elevational view of the drill and reamer portions of the drill/reamer bit shown in FIG. 1;

FIG. 4 is an enlarged, elevational view of the drill and reamer portions of the drill/reamer bit shown in FIG. 1; and FIG. 5 is a partial, elevational view taken in the direction of the arrow in FIG. 3.

DESCRIPTION OF THE PREFERRED EMBODIMENT

Throughout the following description and drawing, an identical reference number is used to refer to the same component shown in multiple figures of the drawing.

Referring now to the drawing and to FIG. 1, in particular, there is illustrated a combined drill/reamer bit 10 constructed in accordance with the teachings of the present invention which performs drilling and reaming operations in a single pass with a high degree of tolerance.

The drill/reamer bit 10 comprises a cylindrical body 12 preferably formed of a high strength steel. A reduced diameter end portion or shank 14 is formed on one end of the cylindrical body 12. A threaded bore 16 is formed in the shank 14 to permit attachment of the shank 14 and the cylindrical body 12 to a tool holder, such as the chuck of a rotary spindle, not shown.

The opposite end of the cylindrical body 12 is formed with a plurality of flutes interconnected by webs or margins. The number of flutes and their shape, either straight or spiral, may vary depending upon the particular application and the required size of the drill/reamer bit 10. By way of example only, two spiral flutes 18 and 20 are illustrated in the drill/reamer bit 10 of the present invention. It will be understood that other numbers of flutes having spiral or straight configurations may also be employed within the scope of the present invention.

As shown in FIGS. 1, 2 and 3, the flutes 18 and 20 extend in a spiral form axially along the cylindrical body 12 toward a cutting tip 22 at one end of the drill/reamer bit 10. The cutting tip 22 defines the point of concentricity of the drill/reamer bit 10 and lies along the longitudinal axis of the cylindrical body 12. The flutes 18 and 20 may be provided in any angle of twist, such as any angle between 15° and 36°, depending upon the particular application of the drill/reamer bit 10. As is conventional, notches 24 and 26 are formed at the upper ends of the flutes 18 and 20, respectively. Webs or margins 28 and 30 are formed between the flutes 18 and 20 and form reduced material sections between the flutes 18 and 20. Additional notches 43 are formed at the upper ends of each of the flutes 18 and 20, as shown in FIGS. 2 and 3.

The drill/reamer bit 10 includes a drill portion 32 and a reamer portion 34. The drill portion 32 is formed by inclined cutting faces 36 and 38 which extend angularly from the cutting tip 22 at one end of the cylindrical body 12. As shown more clearly in FIG. 4, the cutting faces 36 and 38 are formed at a predetermined included angle denoted by reference number 40. Preferably, the included angle between the cutting faces 36 and 38 is approximately 135°. The cutting faces 36 and 38 thus form drill or cutting edges 40 and 42, respectively, at the upper edges of the flute edges 44 and 46, respectively. The cutting edges 36 and 38 bite into the workpiece and create chips which are removed through the flutes 18 and 20 in a conventional manner during rotation of the drill/reamer bit 10.

The reamer portion 34 is axially contiguous with the drill portion 32 on the cylindrical body 12 and is spaced from the cutting tip 22. As shown more clearly in FIGS. 3, 4 and 5, the reamer portion 34 comprises a first face or relief 48 which is formed on the edge of each flute 18 and 20 and extends angularly outward from the flute surface and the longitudinal axis of the cylindrical body 12 at a predetermined first angle. The first face or relief 48 defines a first reamer cutting edge during rotation of the drill/reamer bit 10. The first angle, as shown by reference number 50 in FIG. 5 which is taken in direction of the large arrow in FIG. 3, is preferably between 30° and 45°. A 30° angle is preferred.

A high degree of surface finish tolerance, bore size and roundness is achieved by forming a second face or relief 51 on the reamer portion 34 associated with each flute 18 and 20 of the drill/reamer bit 10. The second face or relief 51 is contiguous with the first face 48 and extends angularly therefrom at a second predetermined angle. The second predetermined angle, denoted by reference number 52 in FIG. 5, is less than the first angle 50 of the first face 48 with respect to the longitudinal axis of the cylindrical body 12. The second predetermined angle 52 of the second face 51 may be between 5° and 15°, with a 10° angle being preferred. The second face 51 forms a second cutting face for the reamer portion 34 which provides the high tolerances noted above in a finished bore. The extreme end of the second face 51 is contiguous with the edge of each flute which extends along the length of the cylindrical body 12 as shown in FIGS. 1, 3, 4 and 5.

In summary, there has been disclosed a unique drill-/reamer bit which enables both drilling and reaming to be performed in a single operation thereby minimizing manufacturing costs due to the reduced number of operations required in forming or machining a workpiece. In addition, the drill/reamer bit of the present invention provides high tolerances with regard to bore diameter, roundness, concentricity and micro or surface finish. These results are obtained by forming a reamer portion which includes first and second angularly disposed faces or reliefs, each disposed at a different angle with respect to the longitudinal axis of the bit.

I claim:

1. A combined drill and reamer bit comprising:
  a cylindrical body with a plurality of flutes separated by web portions and terminating in a cutting tip;
  a drill portion and a reamer portion formed on the cylindrical body;
  the edge of the flutes adjacent the cutting tip defining a cutting edge of the drill portion;
  a notch formed in each flute extending from the cutting tip a predetermined distance along each flute;
  the reamer portion being spaced from the tip and axially contiguous with the drill portion, the reamer portion including:
  a first relief intersecting the edge of the flute of the drill portion and extending angularly outward from the flute edge at a first predetermined angle; and
  a second relief formed on the reamer portion contiguous with and extending angularly outward at a second predetermined angle from the first relief, the angle of the second relief being less than the angle of the first relief, the second relief terminating in an edge on the flute parallel to the axis of the cylindrical body.

2. The combined drill and reamer bit of claim 1 wherein:
  the first angle is between 30° and 45° with respect to the flute surface.

3. The combined drill and reamer bit of claim 2 wherein:
  the first angle is 30° with respect to the flute surface.

4. The combined drill and reamer bit of claim 2 wherein the second angle is between 5° and 15° with respect to the flute surface.

5. The combined drill and reamer bit of claim 4 wherein the second angle is 10° with respect to the flute surface.

6. The combined drill and reamer bit of claim 1 wherein the flutes are spiral flutes.

7. The combined drill and reamer bit of claim 1 wherein at least two flutes are formed on the cylindrical body.

8. The combined drill and reamer bit of claim 1 wherein the included angle between the cutting faces of the cutting tip is substantially 135°.

9. A combined drill and reamer bit comprising:
  a cylindrical body with at least two spiral flutes separated by web portions and terminating in a cutting tip;
  a drill portion and a reamer portion formed on the cylindrical body;
  the edges of the flutes adjacent the cutting tip defining a cutting edge of the drill portion, the included angle between the cutting edges of the cutting tip being substantially 135°;
  a notch formed in each flute extending from the cutting tip a predetermined distance along each flute;
  the reamer portion being spaced from the cutting tip and axially contiguous with the drill portion, the reamer portion including:
  a first relief intersecting the edge of the flute of the drill portion and extending angularly outward from the flute edge at a first angle of substantially 30°; and
  a second relief formed on the reamer portion contiguous with and extending angularly outward from the first relief, the second relief being at a second angle of substantially 10° with respect to the flute edge, the second relief terminating in an edge on the flute parallel to the axis of the cylindrical body.

* * * * *